United States Patent
Kurzweil et al.

[11] Patent Number: 5,955,215
[45] Date of Patent: Sep. 21, 1999

[54] BIPOLAR ELECTRODE-ELECTROLYTE UNIT

[75] Inventors: Peter Kurzweil, Hersbergweg; Ottmar Schmid, Hinterer Birken, both of Germany

[73] Assignee: Dornier GmbH, Friedrichshafen, Germany

[21] Appl. No.: 08/897,568

[22] Filed: Jul. 21, 1997

[30] Foreign Application Priority Data

Jul. 19, 1996 [DE] Germany .............. 196 29 154

[51] Int. Cl.$^6$ ...................................... H01M 4/86
[52] U.S. Cl. .............. 429/41; 429/42; 429/40; 429/210; 361/502; 204/290 R; 204/294
[58] Field of Search ............... 361/502; 429/210, 429/40, 41, 42; 204/290 R, 290 F, 294, 254, 255, 268, 269

[56] References Cited

U.S. PATENT DOCUMENTS

| | | | |
|---|---|---|---|
| 4,761,216 | 8/1988 | Cawlfield | 204/294 |
| 4,765,874 | 8/1988 | Modes et al. | 204/294 |
| 5,080,963 | 1/1992 | Tatachuk et al. | 204/294 |

FOREIGN PATENT DOCUMENTS

| | | |
|---|---|---|
| 0 622 815 B1 | 9/1996 | European Pat. Off. . |
| 196 40 916 | 10/1996 | Germany . |

*Primary Examiner*—Bruce F. Bell
*Attorney, Agent, or Firm*—Evenson, McKeown Edwards & Lenahan P.L.L.C.

[57] ABSTRACT

A bipolar electrode-electrolyte unit for an electrochemical cell includes a barrier layer, at least two carrier layers and at least two active layers, and an electrolyte. The active layers comprise an electroactive material with low resistance and high capacitance. The barrier layer is electrically conducting, is impermeable to matter, and is made of compressed carbon, impregnated carbon, compressed and impregnated carbon, plastic-bonded carbon or carbon-coated sheet metal. The carrier layers, each located between a barrier layer and an active layer, form an electrically conducting porous three-dimensional structure with a large specific surface that contains a material selected from the group consenting of carbon fiber papers, carbon fiber films, carbon fiber mats, carbon fiber fabrics, compressed graphite flakes and carbon fibers, conducting plastic, and carbon produced by pyrolysis or dehydration of organic materials.

18 Claims, 5 Drawing Sheets

BIPOLAR ELECTRODE-ELECTROLYTE UNIT

BACKGROUND AND SUMMARY OF THE INVENTION

The invention relates to a bipolar electrode-electrolyte unit for electrochemical cells, like those used in double-layer capacitors, fuel cells, electrolyzers, gas sensors, or bifunctionally operated systems.

In a bipolar electrode, one side operates as a cathode and the other as an anode, and there is an electrically conducting connection impermeable to gases and electrolytes between the cathode and anode sides. Both sides are in contact with an ion conductor (electrolyte).

At the phase boundary between the electron and ion conductors, electrochemical processes occur that produce interface capacitances of several farads per $cm^3$. Due to the nature of the electrochemical reactions and also as a result of the large porous surface, these electrodes are advantageously suitable for electrochemical energy converters and storage devices in which high currents flow because of a material reaction. In the simplest case, the current through the electrode cross section is described by Faraday's Law and the Butler-Volmer equation.

Electrochemical energy storage using bipolar electrodes was described in European Patent Document EP 0 622 515 B1. To achieve high operating voltages, an arbitrary number of bipolar electrodes are connected electrically in series and a so-called electrode stack is constructed.

An object of the present invention is to provide a bipolar electrode-electrolyte unit with improved conductivity, capacitance, electrochemical activity, and integration capability for electrochemical cells with a high energy and power density.

This and other objects and advantages are achieved by the electrode-electrolyte unit according to the invention, which comprises a bipolar electrode with a barrier layer as well as at least two carrier layers and at least two active layers. It has the following characteristics:

- the active layers consist of an electroactive material with low resistance and high capacitance;
- the barrier layer is electrically conducting, impermeable to material, and consists of compressed and/or impregnated carbon, plastic bonded carbon, or carbon-coated sheet metal;
- the carrier layers located between the barrier layer and an active layer form an electrically conducting porous three-dimensional structure with a large specific and geometric surface that contains carbon fiber papers, carbon fiber films, carbon fiber mats, carbon fiber fabrics, compressed graphite flakes, and carbon fibers, conducting plastic or carbon produced by pyrolysis or dehydration of organic materials;
- the barrier layer and carrier layer form a stable mechanical and electrical bond produced by gluing, rolling, or compression; and
- the electrolyte is a good conductor.

By connecting several electrode-electrolyte units electrically in series (in a row or by stacking them on top of one another), an electrode stack is produced, with the electrolyte being located between two bipolar electrodes in each case.

Other objects, advantages and novel features of the present invention will become apparent from the following detailed description of the invention when considered in conjunction with the accompanying drawings.

BRIEF DESCRIPTION OF THE DRAWINGS

FIGS. 6(*a*) and 6(*b*) show embodiments of the arrangement of electrode-electrolyte units according to the invention in electrochemical cells designed for use as an energy storage device (supercapacitor), and for a gas-operated power source (fuel cell), respectively.

DETAILED DESCRIPTION OF THE DRAWINGS

Figure 1:
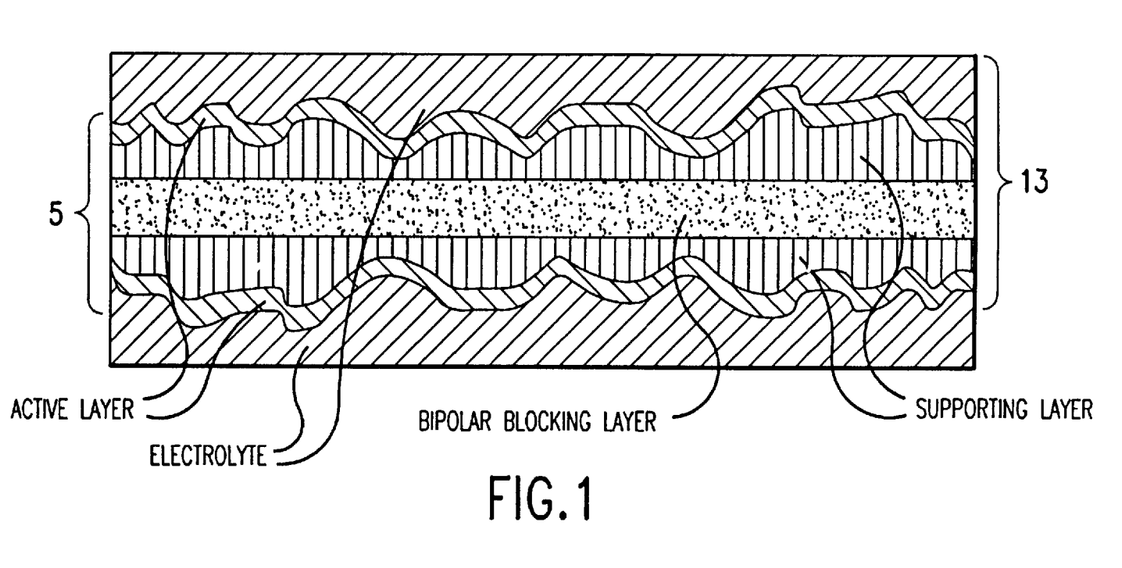
FIG. 1 shows a bipolar electrode-electrolyte unit according to the invention.

The design of a bipolar electrode-electrolyte unit according to the invention as shown in FIG. 1 consists of a laminate of selected electron and ion conductors. This arrangement addresses the following problems:

1. Production of a thin barrier layer 2, located between the active surfaces (carrier layer 3) and with active layer (1) of the bipolar unit mounted on top that is mechanically stable and electrically highly conducting and also remains fluid-impermeable, gas-tight, and electrochemically stable in the long term. (The term "barrier layer" is not used here in the sense of an electrical insulator, but refers in general to a body that is impermeable to matter.)

2. Application of a thin macro-, meso-, and/or microporous thermally stable carrier layer 3 (actually, two layers in FIG. 1) to the barrier layer, with the goal of producing a large specific and geometric surface. The carrier and barrier layers are intended to form a combination with good conductivity.

3. Application of a porous electrochemically active layer 1 with low resistance and high capacity.

4. Establishing contact between bipolar electrode 5 and an electrolyte 4 with high conductivity and, depending on the application, with a high dielectric constant and decomposition voltage.

5. Insertion of a structured plate (not shown in FIG. 1) between two bipolar electrode-electrolyte units in cases where gaseous or liquid materials are to be brought to or taken away from the active layer. Alternatively, the barrier layer can be provided with gas channels or a flow field (FIG. 6B).

Figure 3:
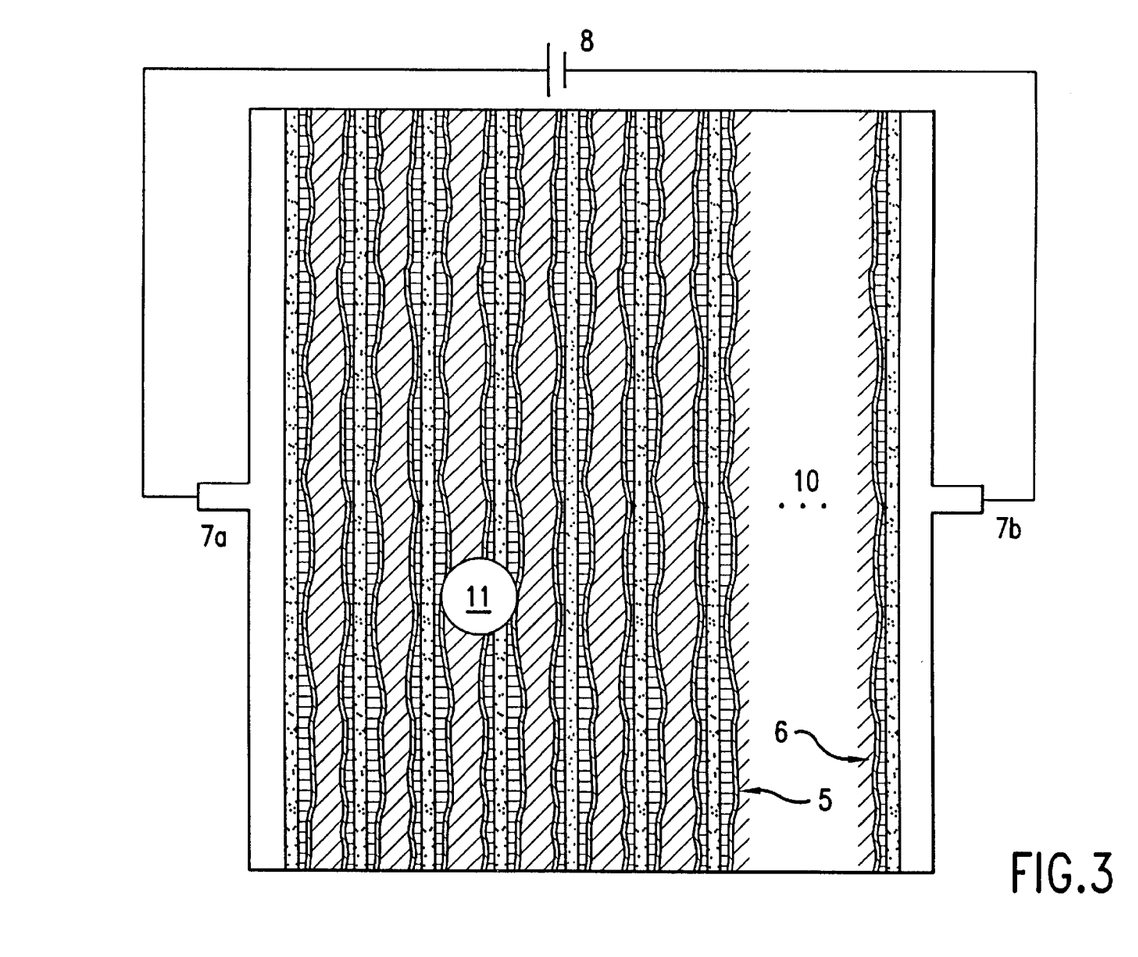
FIG. 3 shows a stack of several electrode-electrolyte units according to the invention.

The functional ability of the electrochemical cell is produced by the electrical connection of several bipolar electrode-electrolyte units 13 (FIG. 1) in an electrical series circuit 10 as shown in FIG. 3 to produce a stack 11. Two unipolar terminal electrodes 6 form the terminals. Electrical contact is ensured by conducting layers or plates 7*a*, 7*b*. Depending on the application, stack 11 can be placed in a housing that provides electrical and mechanical protective functions. The cell can be charged from an external power source 8 or discharged by an external consumer.

Figure 4:
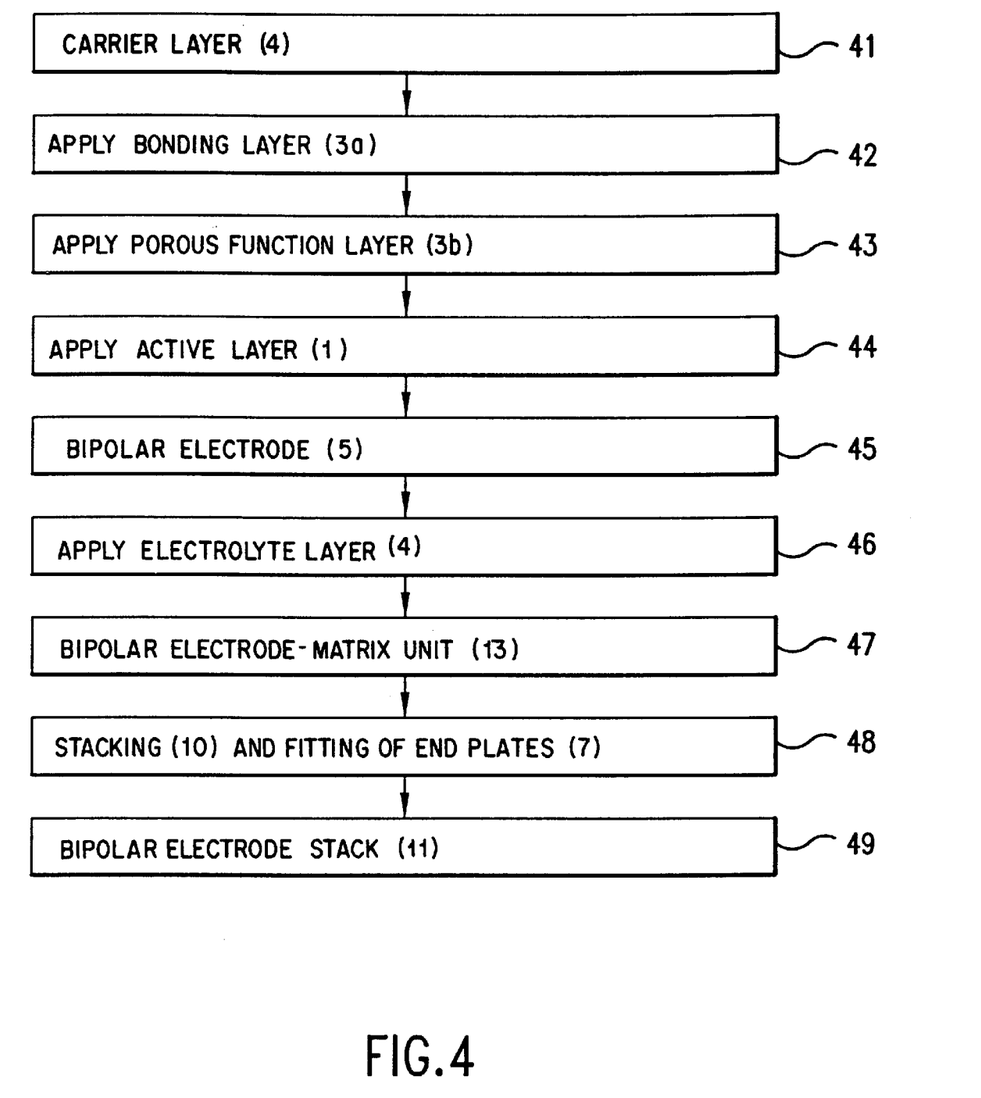
FIG. 4 shows a process for producing an electrode-electrolyte unit according to the invention.

FIG. 4 is a diagram which illustrates a process for producing a bipolar electrode stack such as shown in FIG. 3. In step 41, the process starts with the application of the carrier layer 3 to the barrier layer 2. Thereafter, in step 42 the binding layer 3*a* is applied and in step 43 the porous functional layer 3b is applied on top of that. Next, in step 44, the active layer 1 is applied, thereby producing the bipolar electrode unit 5 (step 45) as indicated in FIGS. 1 and 3. Then, an electrolyte layer 4 is applied in step 46, to produce the bipolar electrode matrix unit 13 (step 47) as shown in FIG. 1. Finally, a stack 10 of such units is joined with the end plates 7 in step 48 to produce the bipolar electrode stack (11) in step 49.

In the following, preferred embodiments of the individual layers of the electrode-electrolyte unit according to the invention will be described.

a) Barrier Layer

The goal of barrier layer 2 is to create a light, stable, and conducting connecting surface between two opposite carrier layers 3 that is not transparent (that is, it is impermeable) to matter. The barrier layer consists of an electrically conducting material such as a metal (nickel, steel, titanium, or nonferrous metal, for example), carbon (graphite, for example) or conducting plastics. It should be as thin as possible and its surface may be smooth or rough. Films, sintered bodies, and compressed bodies may be used in addition to rolled ware and plate material as for example:

compressed graphite films;
carbon-fiber-reinforced carbon;
carbon papers or films sealed with resin;
plastic-bonded carbon, for example with PTFE (polytetrafluoroethylene) or PVDF (ployvinylidenefluoride) or PP (polypropylene) or PPS polyphenylenesulfide-bonded graphite flakes and graphite hard felt;
conducting rubber or other conducting plastics such as butyl rubber and carbon-black-filled propylene;
films made of polypyrene, polythiophene, polyacetylene, or another metallically conducting polymer;
films made of pure nickel or nickel alloys;
films made of pure titanium or titanium alloys, possibly platinum coated;
stainless steel films 1.4539, 1.4571, 1.4462, 1.4401 and the like;
sheet metal coated with conducting paint.

In the case of plate material, the barrier layer can also be referred to as a bipolar plate. The term "conducting plastic" will be used below to refer to any combination of carbon and polymer components.

Sufficiently thick metal or carbon layers can be deposited on carrier layer 3 by sputtering. The conventional spraying and coating methods such as (CVD and PVD, plasma and flame spraying, and galvanization, for example see DIN 8580), are also suitable for producing the barrier layer.

Carbon materials have the advantage that they
are very corrosion-resistant;
have a low specific weight;
are very well suited for forming a stable mechanical bond with the plastic components provided for the carrier layer; and
have a high overvoltage for decomposition of water.

The barrier layer must effectively prevent penetration of fluids over a long lifetime. Carbon materials are impregnated with suitable resins on a furan, epoxy, acrylate, or other polymer base. The matter-tight, electrically highly conducting barrier layer is produced by subsequent heat treatment.

b) Carrier Layer

The purpose of carrier layer 3 is to create a structured electrical contact surface between the active layer and the barrier layer. The carrier layer is a porous three-dimensional structure with a large geometric and specific surface, low resistance, and low weight. Upon contact with an electrolyte, a high double-layer or pseudo capacity is measured at the carrier layer. There is good electrical contact between the carrier layer and the barrier layer, and between the carrier layer and the active layer. The carrier and barrier layers, when produced according to the invention, have a stable mechanical and electrical bond.

The carrier layer is preferably made of carbon or metal. For reasons of simple technical manufacture, fabric, mat, or film type layers are preferred. Examples include:

carbon fiber papers;
carbon fiber films and mats;
carbon produced by pyrolysis or dehydration of organic substances;
carbon-polymer films or other plastic-bonded carbon;
glass carbon;
nickel felts with a 50% fiber and 50% powder content;
nickel foams.

In theory, the carrier layer can also be produced by applying powdered educts or suspended particles (composed for example of carbon, metal, or conducting polymers) using a spraying, sputtering, painting, dipping, sintering, compression, or silk-screen process, etc.

The spatial structure of the carrier layer offers the particles of the active layer an area to which they can adhere that has a large surface so that active material is saved and electrodes with specific capacities up to 800 farads/gram of metal oxide are obtained.

Activated charcoal, coke, carbon black, carbon foams, and pyrolysis products of plant and petrochemical origin are used for carrier layers made of carbon. Basically, their specific surfaces must be large and their electrical resistances low.

In order to improve the wetting of the carrier layer by the electrolyte, the carrier surface can be hydrophilized. For this purpose, heat treatment in air at about 150 to 1200° C. is suitable, with carboxyl groups forming, among others, or with electrochemical oxidation taking place in which the carrier layer is exposed to an anodic current.

For improved adhesion promotion between the barrier layer and the carrier layer, the bifunctional design described below can be used.

c) Bifunctional Carrier Layer

Figure 2:
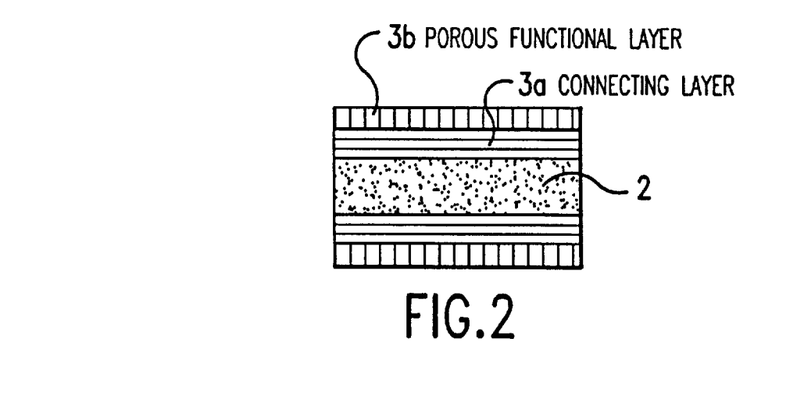
FIG. 2 shows a barrier layer with carrier layers applied on top of it in a bipolar electrode-electrolyte unit according to the invention.

Carrier layer 3 must guarantee good electrical contact with barrier layer 2 and must also exhibit high electrical conductivity. Therefore it may be necessary to make it as two layers as shown in FIG. 2:

1. Connecting layer 3a ensures stable mechanical and electrical coupling of the carrier layer to the barrier layer.

Suitable materials for this purpose include:
thin graphite films or graphite films with metal plies;
compressed graphite flakes;
glass carbon;
metal nets or felts;
electrically conducting adhesive or paint layers;
carbon produced by pyrolysis of organic compounds.

The materials can be applied under pressure and/or heat, and especially by a welding or sintering process. One example is the carbonization of suitable polymer preliminary stages, with the carrier and barrier layers being joined by a thin layer of carbon.

2. Porous functional layer 3b is applied to connecting layer 3a in the same manner as in paragraph 1. The functional layer can then penetrate completely into the connecting layer and form a unit therewith. The materials described under b) are used. For example, carbon fiber bodies can be pressed into a film made of conducting plastic or graphite.

Another example is the application of carbon fiber bodies to a graphite film, using a resin or adhesive, and then subjecting them to a heat treatment. The adhesive can serve simultaneously to impregnate the graphite film.

FIG. 2 shows layers 3a, 3b with flat surfaces, while in FIG. 1 the single carrier layer 3 has a complex three-dimensional structure. By the same token, however, the single carrier layer 3 shown in FIG. 1 could be made flat and carrier layers 3a, 3b shown in FIG. 3 could have a complex three-dimensional structure. The various carbon materials used for the carrier layer guarantee a spatial structure with a large specific and geometric surface that allows much higher power densities by comparison with conventional materials.

d) Active Layer

The purpose of active layer 1 is to produce statistically distributed reaction centers on the surface of the carrier layer. Electrochemical reactions take place on the active layer and produce interface capacitance, allowing high currents to flow. The active layer can cover the carrier layer completely or partially, or can be applied in the form of "seeds."

The active layer preferably consists of metal oxides, such for example as is disclosed in European Patent Document EP 0 622 815 B1 or perovskites such as suggested in German patent document DE 196 40 926.8, applied in a separate work step to the carrier layer. In the first case, redox-active, substoichiometric metal oxide hydrates with a specific water content are used, such as $RuO_2 \cdot xH_2O$ and $IrO_2 \cdot xH_2O$. The energy storage ability is based on the reversible alternation of oxidation stages III and IV. The metal oxide is electronically conducting and exchanges protons with the electrolyte. The metal oxide can therefore be thought of as a low-temperature proton conductor. It is produced for example by a sol-gel process in which a ruthenium salt is treated with lye. Subsequent drying adjusts the specific water content of the metal oxide hydrate powder, which determines its electrochemical properties. Ideal drying temperatures are between 80 and 325° C. The metal hydrated oxide may contain a proton-conducting platinum metal hydrated oxide that is produced from platinum metal compounds by the addition of dilute lye and subsequent drying at less than 3.25° C.

Coating can be performed using spraying, painting, dipping, sintering, or silk-screen methods. Polymers or inorganic or organic binders may be added as adhesion promoters. Suitable binders include Nafion® solution, polytetrafluoroethylene, thick oil, inorganic or organic compounds of titanium, aluminum, or silicon. Thick oil is a mixture of resin and solvent that contains nitrocellulose, butanol, etc. and is used as the base for making paints or silk-screen pastes.

The active layer can also consist of a mixture or laminate of metal oxides with the carbon bodies described in greater detail in b). Other examples include: metal oxides deposited on activated charcoal or conducting graphite, with the metal oxide being located structurally chemically on or in the carbon particles. Suitable carbon materials include for example activated charcoal (Chemviron®), graphited carbon black (Vulcan XC-72®), and highly conducting carbon black (Printex XE2®).

e.1) Electrolyte

Electrolyte 4 is preferably in intimate mechanical and electrical contact with the active electrode layer composed of carrier layer 3 with active layer 1 on top of it. The electrolyte layer contains an ion conductor with a high electrical conductivity. Possible embodiments include:

a) a. aqueous solutions, dilute acids, inorganic acids, or organic lyes, and solvents such as organic solvents, containing conducting salts;

b) b. a fixed electrolyte, with the material listed under a) being held by capillary forces in an absorbent material (matrix); these materials can be textile fabric or films such as the following for example:

porous polytetrafluoroethylene and its sulfonated derivatives;

nonwoven fibers or films of polypropylene, polyamide, polyvinyl chloride, polyethylene oxide, PVDF, or polystyrene sulfonic acids, zirconium dioxide fabric;

polyethylene, reinforced with silicon dioxide for example;

phenolic resins, on polyester carriers for example;

phenol-formaldehyde resins, on cellulose paper; and glass fiber fabric.

c. Applied electrolytes, with the materials listed in a. above being processed with inorganic or organic binders to form a paintable paste; suitable binders include aluminum oxide, silicon dioxide, or fluoropolymers. Examples are: 3 to 10 mol/l sulfuric acid+$SiO_2$, $NaHSO_4$ solution+$SiO_2$, KOH+$Al_2O_3$ or MgO or $SnO_2$.

d. organic solid electrolytes such as ion or proton exchange membranes, for example Nafion®, sulfonated polyamides, or comparable substances.

e. So-called superacids, for example "$SO_4/ZrO_2$," heteropolyacids of tungsten or molybdenum, fluorosulfonic acid/$SbF_5$, sodium-aluminum-oxides.

e.2) Electrolyte Additives can include

Potassium fluoride, bromide, urea or lithium salts, in order to improve the proton-conducting properties of the active layer; palladium salts in order to create absorption locations for hydrogen or as a recombination catalyst.

f) Bipolar Electrode Unit

The electrode unit 5 is an electrically conducting combination of a mechanically stable temperature-resistant and fluid-tight barrier layer (produced for example as described under a) above) coated on both sides with a porous carrier layer (see b)) and an electrochemically active layer resting on top (see c)).

g. Bipolar Electrode Electrolyte Unit

Figure 5:
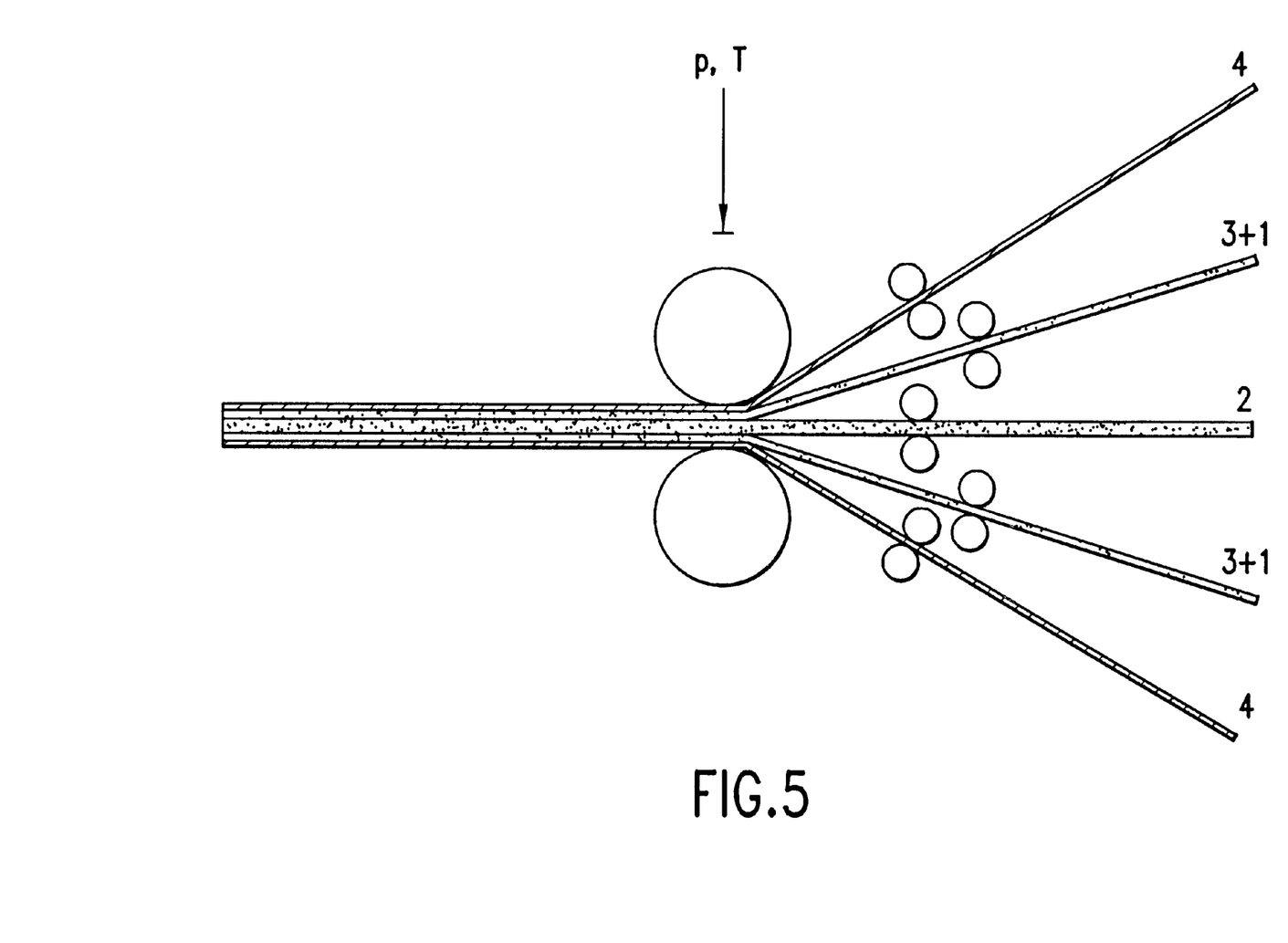
FIG. 5 shows a device for manufacturing an electrode-electrolyte unit according to the invention.

The electrode-electrolyte unit 13 (also abbreviated in the following as the EEU) (FIG. 1) is an electrically conducting combination or series connection of bipolar electrode 5 with electrolyte 4. The EEU should be as thin and lightweight as possible in order to achieve high electrical energy and power per unit volume and weight. Gas-permeable separators can be located between the EEU, provided the exchange of gas and material with the active carrier layer (carrier layer 3 with active layer 1 on top), with the electrolyte chamber 4, and with the environment surrounding the EEU is desirable. FIG. 5 is a schematic diagram of a process showing how the EEU combination is produced from barrier layer 2, actively coated carrier layer 3+1, and the electrolyte layer by the action of pressure and possibly temperature.

EXAMPLES

Example 1

EEU

Barrier layer 2 is a steel film 50 μm thick or a metal-reinforced graphite film. Graphite film or compressed graphite flakes 3a (FIG. 2) are placed on top of it as a two-layer carrier layer and carbon fiber fabric or paper 3b is rolled in place. In this case the graphite film serves as an adhesion promoter and the carbon fibers serve as a large-surface-area support for the active layer. As a result of the application process, fiber body 3b is pressed into soft connecting layer 3a. The adhesion of layers 3a and 2 can be improved even further by applying a conducting adhesive or Nafion® solution. Active layer 1 is placed on carrier layer 3 in a subsequent step. The adjoining electrolyte 4 is a sulfuric-acid-saturated zirconium dioxide fabric or a proton exchange membrane. A variation on the manufacturing process of a bipolar electrode stack 11 is shown in FIG. 4. Here the numbers shown correspond to the reference numbers in FIGS. 1 to 3. Suitable materials for the end plates, seals, electrolyte, and separators are described for example in German patent document DE 43 13 474.

Example 2

EEU

Barrier layer 2 is a thin film of impregnated graphite film, plastic-bonded carbon, titanium, nickel, or steel. A carbon fiber paper is applied as a carrier layer 3. The active layer consists of metal oxide applied by silk-screen or sintering. (Exemplary coating techniques are described for example in German Patent Document DE 43 13 474.) The electrolyte is silica-stabilized polyethylene, zirconium dioxide fabric, or polytetrafluoroethylene film saturated with sulfuric acid.

Example 3

Carrier Layer

In the simplest case, the carrier layer consists of carbon fiber paper. A two-layer structure is produced as a combination of carbon fibers with graphite flakes and possibly some additional polymers. The carbon fibers are in the form of films, fabrics, or fleeces of pitch-coated paper or PAN fibers. Pitch-coated fibers have an especially favorable long-term resistance to sulfuric acid, even under oxidizing conditions. PAN fibers exhibit a more pronounced anisotropy of conductivity.

Example 4

Adhesion Promotion by Gluing

As a result of the strong connection between the supporting layer and the barrier layer formed by gluing, rolling, or pressing, in addition to high stability, a reliable and good electrical contact is produced between the two layers. In particular, high contact resistances, which adversely affect internal resistance, are avoided.

Carbon fiber fabric is applied to a metal or graphite barrier layer 2 by a gluing process. Carbon fibers 3b are painted or saturated with a suspension of an adhesive or polymer, applied to the carrier, and adhesion layer 3a is then produced by a chemical, thermal, or pyrolytic step. Suitable adhesives are conducting paints, epoxy resins, silicones, phenolic resins, polyacrylonitrile resins, or Nation® solution. Heat treatment produces adhesive layers between the barrier and carrier layers that are good conductors.

Example 5

Carrier Layer

A carbon fiber 3b saturated with a metal salt is placed on a thin graphite or nickel, steel, or titanium film 2. The metal salt can be ruthenium (III) chloride, hexachloroiridic acid, or hexochloroplatinic acid. Connecting layer 3a is produced when the metal salt is thermally decomposed at about 400° C.

Example 6

Carrier Layer with Active Layer

Organic bodies, textile fabrics, or piles (for example PAN, PMMA, PS, PPS, PVDF, PP, phenolic resins, or other polymers), or products containing sugar, cellulose, or protein (for example saccharose, milk, or lignin) are pyrolyzed on a carbon or metal carrier. For adhesion promotion, the organic body can be glued in advance. Pyrolysis can occur both thermally and under the influence of sulfuric acid or nitric acid (dehydration). The metal oxide is then applied or the organic body is reacted with a metal oxide prior to pyrolysis. Depending on the preliminary stage and the temperature, several carbon-black-like or graphitic carbon layers are produced. PAN is usually carbonized under the influence of air or regulated oxygen that is admitted. When air is excluded or in a reducing atmosphere, during the subsequent heat treatment at about 800 to 1800° C. (at 900° C. for example), chain-like carbon structures and heteroatoms are eliminated. During graphitization above 1800 to 2000° C., ordered carbon structures appear and thus products with excellent electrical conductivity are obtained.

Example 7

Barrier Layer, Bipolar Plate

Because of its natural porosity, carbon can only be made suitable for the barrier layer by a compaction process. An especially suitable embodiment contains polymers. Graphite flakes or carbon particles are mixed with polymers (for example PVDF, PSU, PP, PE, PTFE, PEEK, PPS, phenolic resins, PMMA, PS, polycarbonate) and processed to produce a thin film. This can occur in a hot pressing or rolling process under the influence of heat. The product according to the invention is a film made of plastic-bonded carbon, called "conducting plastic" for short.

Example 8

Bipolar Electrode

The bipolar electrode is produced by compressing a graphite film (see Example 9) between two carbon fiber fleeces. Under the subsequent influence of heat, a bond with good adhesion and high electrical conductivity results.

In one variation on the process, the graphite and carbon fiber material is joined with the aid of a polymer mixture (see Example 7 for example). As a result of the thermal decomposition of the polymer, an adhesion-promoting connecting layer is formed between the graphite film and the carbon fiber layer. In another version, an activated charcoal-polymer mixture is applied to both sides of the barrier layer and then heat-treated, carbonized, and/or graphited. The barrier and carrier layers form a bonded unit that can be separated only with difficulty.

Example 9

Bipolar Electrode

Graphite flakes or carbon particles are mixed with a polymer (see Example 7 for example) and compressed with a carbon fiber paper, fleece, or fabric. Typical process parameters for the hot pressing process are pressures of 100 to 1000 kg/cm$^3$ at temperatures of 100 to 500° C. This carrier layer is sintered, glued, or hot-pressed onto the barrier layer (see Examples 10 and 11).

The electrode can also be manufactured by the hot-pressing method in one work step, with the carbon and polymer components being painted onto the carbon paper and this paper then being placed on both sides of the barrier layer and compressed.

The electrode surface can be modified by subsequent processes. Hydrophilization is advisable to ensure good electrolyte contact. This is accomplished by heat treatment in an oxidizing atmosphere, by etching, or by electrochemical roughening.

Example 10
Barrier Layer, Bipolar Plate

The barrier layer must be fluid-tight. If graphite is used, it must be made pore-tight in advance. Furan resins, epoxy resins, acrylate resins, or PTFE are especially suitable for impregnation. As the result of a subsequent heat treatment (carbonization), products are obtained with a high electrical conductivity. In this way, the electrochemical advantages of the graphite for bipolar electrodes are achieved.

Example 11
Barrier Layer

The barrier layer, rolled as a bipolar plate, is a mechanically or chemically roughened carbon plate made for example of graphite or glass carbon. Suitable etchants include nitric acid, sulfuric acid/potassium permanganate, or another oxidizing agent. An electrochemical roughening process is also possible that uses high anode voltages. The advantage of etching is a nano- and microporous structuring of the barrier layer so that it has a larger geometric and specific surface and improved adhesion for the carrier layer.

Example 12
Fixed Electrolyte

Three-molar sulfuric acid is fixed by capillary forces in a microporous separator made of polyethylene. Typically the separator is composed of 24% polyethylene, 12% oil, 61% silicon dioxide, and 3% carbon black.

The thickness is less than 300 $\mu$m, and stability under pressure is good. Sulfuric-acid-resistant sealing surfaces are produced using adhesives based on acrylates and fluorosilicones.

Example 13
Electrolyte Pastes

Electrolyte 4 is painted onto the bipolar electrode in the form of a paste made of sulfuric acid or potassium hydroxide solution and aluminum oxide.

Example 14
Active Layer, Metal Oxide

By means of a sol-gel process, ruthenium dioxide hydrates are obtained from ruthenium compounds and lye. The pH value of the precipitate is 7 to 14. Depending on the water content and oxygen deficiency stoichiometry, proton-conducting products are obtained with an excellent electrical conductivity and a high capacitance relative to weight (up to 800 F/g). The desired water content is set by a heat treatment at 80° C. to 325° C. Suitable starting stages are ruthenium chloride, ruthenium nitrosyl nitrate, ruthenate (from ruthenium metal and peroxodisulfate or ruthenium alcohols). They are added in a hydrochloric acid solution. Instead of ruthenium, iridium compounds can be used equally well. Depending on the requirements, additives such as fluoride-doped stannic oxide, tantalum oxide, manganese oxide, lead oxide, etc. can be admixed. The specific surface of the powder is more than 100 $m^3$/g. Filling with dilute lye produces especially large specific surfaces. The powder contains about 1% sodium and less than 300 ppm chlorine.

A grain size of less than 50 mm is obtained by grinding and screening. Compounds of platinum group metals are expressly mentioned as suitable electrocatalysts. An economical improvement consists of perovskites that could contain ruthenium.

Example 15
Active Layer 100 g of the metal oxide (Example 14) are intensively mixed with 40 g 5% Nafion® solution or thick oil and 150 g of water, in a ball mill for example. The resultant paste is brushed onto the bipolar electrodes, applied with a spatula, or applied by silk-screen. For improved wetting, the electrode can be moistened in advance with a mixture of alcohol and water. The coated electrode is then ready to use after drying in air.

Example 16
Silk-Screen Paste

The silk-screen paste is intended to be resistant to acids and oxidation, and to adhere well to the carrier. Approximately 43% metal oxide is mixed with about 3% polymer (PTFE, Nafion®, PI, PE, epoxy resin, PSU, PEEK, etc.) and approximately 54% solvent (for example PVP, Sulfolan, NMT, alcohols).

The evaporation number must be high enough that the paste can be worked when tacky, but subsequent heat treatment of the electrode can be eliminated or not exceed 800 to 100° C.

Example 17
Aftertreatment

The adhesion of the metal oxide layer is improved by hydrophilization of the carrier layer (see b).

Alternatively, an aqueous 2% Nafion® solution can be sprayed onto the freshly applied active layer and dried in air. As a result, the active layer is fixed to the electrode.

Example 18
Bifunctional Application

Figure 6A:
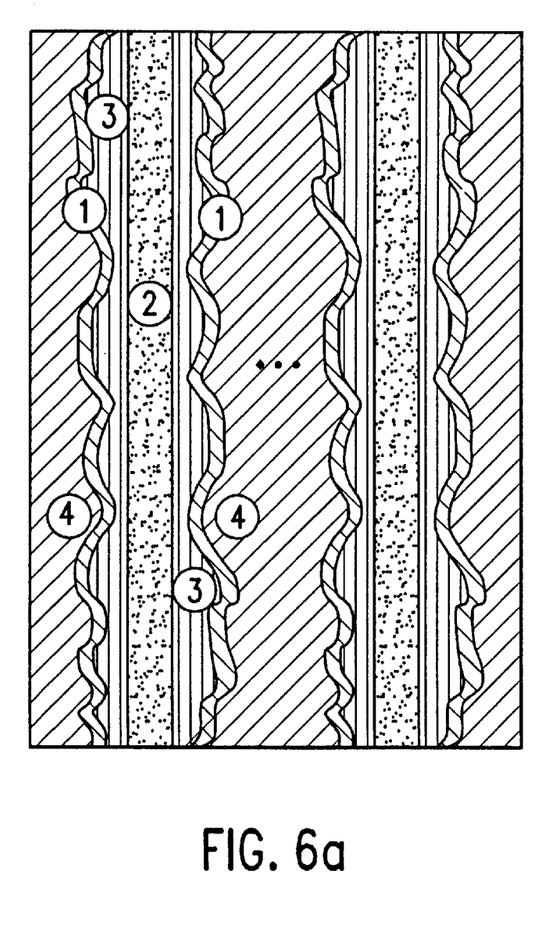
Figure 6B:
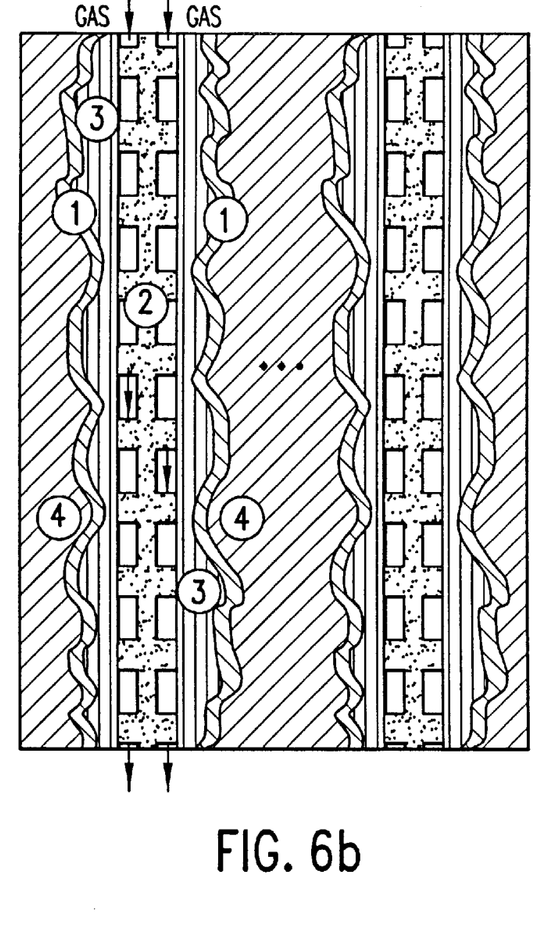

According to the invention, EEU is used for short-term energy storage (supercapacitors, FIG. 6a.). If gas lines are brought into the bipolar electrode or a flow field is created, gas-operated power sources (fuel cells) can be made, (see FIG. 6b.) Porous carrier layer 3 is also capable of performing gas distribution. The process-engineering measures for eliminating product water, moistening, and heating/cooling are not the subject of this invention but linked to the extent that the fixed electrolyte and carrier layer assume important storage, transport, and distribution tasks.

Example 19
Barrier Layer

Corrosion-sensitive supports such as steel for example can be coated with a conducting paint by spraying, dipping, brushing, or wiping. This results in long-term stability in aggressive media. A typical composition of a conducting paint is: conducting particles (carbon, conducting graphite, metal particles such as Ag/Cu, Pt) in an elastomer matrix (epoxy, silicon, fluorosilicon), and a solvent. The conducting paint creates a stable bond between the carrier layer and the barrier layer.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Bipolar electrode-electrolyte unit for an electrochemical storage device, said electrode-electrolyte unit comprising a barrier layer, at least two carrier layers and at least two active layers, and an electrolyte, wherein the active layers comprise an electroactive material with low resistance and high capacitance;

the barrier layer is electrically conducting, is impermeable to matter, and is made of a material selected from the group consisting of compressed carbon, impregnated carbon, compressed and impregnated carbon, plastic-bonded carbon; and carbon-coated sheet metal;

the carrier layers, each located between a barrier layer and an active layer, form an electrically conducting porous three-dimensional structure with a large specific and geometric surface that contains a material selected from the group consisting of carbon fiber papers, carbon fiber films, carbon fiber mats, carbon fiber fabrics, compressed graphite flakes and carbon fibers, conducting plastic, and carbon produced by pyrolysis or dehydration of organic materials;

the barrier layer and carrier layer form a bond produced by gluing, rolling, or pressing that is stable, mechanical and electrically conducting; and the electrolyte is a good electrical conductor.

2. Bipolar unit according to claim 1 wherein the active layer consists of a perovskite material.

3. Bipolar unit according to claim 1 wherein the active layer consists of a redox-active substoichiometric metal hydrated oxide with a prescribed water content.

4. Bipolar unit according to claim 3 wherein the metal hydrated oxide contains a proton-conducting platinum metal hydrated oxide that is produced from platinum metal compounds by the addition of dilute lye and subsequent drying at less than 325° C.

5. Bipolar unit according to claim 4 wherein said proton conducting platinum metal hydrated oxide contains additives selected from the group consisting of tin, tantalum, and manganese.

6. Bipolar unit according to claim 1 wherein the barrier layer comprises plastic-bonded carbon which is a mixture or a compound of carbon and polymers selected from the group consisting of polyvinylidenefluoride, polysulfone, polypropylene, polyethylene, polytetrafluoroethylene, polyetheretherketone, polyphenylenesulfide, polystyrene, polymethylmethacrylate, phenolic resins, and polycarbonate.

7. Bipolar unit according to claim 1 wherein carrier layer comprises an adhesion-promoting connecting layer and a functional layer with a large surface area.

8. Bipolar unit according to claim 1 wherein that carrier layer is covered by active layer in a manner which is one of completely, incompletely, porously, and in the form of seeds.

9. Bipolar unit according to claim 1 wherein active layer is bonded to carrier layer by a binder selected from the group consisting of perfluorosulfonic acid solution, polytetrafluoroethylene, thick oil, and metal-organic compounds of titanium, aluminum, and silicon.

10. Bipolar unit according to claim 1 wherein the active layer forms a mechanical and electrical unit with carrier layer.

11. Bipolar unit according to claim 1 wherein the electrolyte contains a material selected from the group consisting of aqueous solutions, dilute acids, dilute lyes, superacids, and organic solvents with conducting salts.

12. Bipolar unit according claim 11 wherein the liquid in electrolyte layer is held by capillary forces in an absorbent material selected from the group consisting of zirconium dioxide, porous polytetrafluoroethylene, polypropylene and polyamide.

13. Bipolar unit according claim 1 wherein the electrolyte consists of a paste comprising a first material selected from the group consisting of inorganic acids and lyes, and a second material selected from the group consisting of aluminum oxide, silicon dioxide and fluoropolymers.

14. Bipolar unit according claim 1 wherein the electrolyte is one of an ion exchange membrane or an ion-conducting plastic.

15. Bipolar unit according claim 1 wherein the barrier layer is provided with gas channels or a flow field.

16. A double-layer capacitor comprising a bipolar electrode-electrolyte unit according to claim 1.

17. Bipolar electrode stack comprising a plurality of bipolar electrode-electrolyte units which are electrically connected in series, each of said bipolar electrode-electrolyte units comprising a barrier layer, at least two carrier layers and at least two active layers and an electrolyte, wherein the active layers comprise an electroactive material with low resistance and high capacitance;

the barrier layer is electrically conducting, is impermeable to matter, and is made of a material selected from the group consisting of compressed carbon, impregnated carbon, compressed and impregnated carbon, plastic-bonded carbon; and carbon-coated sheet metal;

the carrier layers, each located between a barrier layer and an active layer, form an electrically conducting porous three-dimensional structure with a large specific and geometric surface that contains a material selected from the group consisting of carbon fiber papers, carbon fiber films, carbon fiber mats, carbon fiber fabrics, compressed graphite flakes and carbon fibers, conducting plastic, and carbon produced by pyrolysis or dehydration of organic materials;

the barrier layer and carrier layer form a bond produced by gluing, rolling, or pressing that is stable, mechanical and electrically conducting; and the electrolyte is a good electrical conductor.

18. Bipolar electrode stack according to claim 17 further comprising a structured layer which is transparent to matter and is located between adjoining bipolar electrode-electrolyte units.

* * * * *